(12) United States Patent
Nacson

(10) Patent No.: US 9,045,977 B2
(45) Date of Patent: Jun. 2, 2015

(54) METHOD OF OIL EXTRACTION

(76) Inventor: Sabatino Nacson, Thornhill (CA)

( * ) Notice: Subject to any disclaimer, the term of this patent is extended or adjusted under 35 U.S.C. 154(b) by 382 days.

(21) Appl. No.: 13/617,760

(22) Filed: Sep. 14, 2012

(65) Prior Publication Data

US 2013/0109598 A1    May 2, 2013

Related U.S. Application Data

(60) Provisional application No. 61/535,491, filed on Sep. 16, 2011.

(51) Int. Cl.
| | |
|---|---|
| C09K 8/524 | (2006.01) |
| E21B 43/16 | (2006.01) |
| C10G 1/04 | (2006.01) |
| E21B 43/18 | (2006.01) |
| C09K 8/588 | (2006.01) |
| C09K 8/584 | (2006.01) |

(52) U.S. Cl.
CPC ............... *E21B 43/18* (2013.01); *C09K 8/588* (2013.01); *C10G 1/04* (2013.01); *C09K 8/584* (2013.01)

(58) Field of Classification Search
USPC ............ 507/218; 208/390; 166/305.1
See application file for complete search history.

(56) References Cited

U.S. PATENT DOCUMENTS

| | | | | |
|---|---|---|---|---|
| 3,437,146 | A | * | 4/1969 | Everhart et al. ............ 166/303 |
| 5,670,460 | A | * | 9/1997 | Neely et al. ............ 507/203 |
| 5,723,423 | A | * | 3/1998 | Van Slyke ............ 510/188 |
| 6,022,834 | A | | 2/2000 | Hsu et al. |
| 6,302,209 | B1 | | 10/2001 | Thompson, Sr. et al. |
| 6,818,599 | B2 | | 11/2004 | Gonzalez et al. |
| 7,137,447 | B2 | | 11/2006 | Shpakoff et al. |
| 7,229,950 | B2 | | 6/2007 | Shpakoff et al. |
| 7,262,153 | B2 | | 8/2007 | Shpakoff et al. |
| 2009/0205823 | A1 | | 8/2009 | Mohanty et al. |

\* cited by examiner

*Primary Examiner* — Aiqun Li
(74) *Attorney, Agent, or Firm* — Vidas, Arrett & Steinkraus, P.A.

(57) ABSTRACT

A composition for use in extracting oil, the composition comprising: (a) a mixture comprising, by weight, 50-55% of an aromatic alkyl, 15-19% d-limonene, 6.5-7% polyethylsorbitan monoleate, 15-15.5% PEG sorbitan monostearate, 3.4-9.9% tall fatty acid, and EDTA in an amount up to 1%; and (b) water in an amount such that the mixture is diluted to 1%-2% by weight of the composition.

10 Claims, 1 Drawing Sheet

METHOD OF OIL EXTRACTION

CROSS-REFERENCE TO RELATED APPLICATIONS

This application claims the benefit of U.S. Provisional Application No. 61/535,491 filed Sep. 16, 2011, the contents of which is hereby incorporated by reference.

FIELD OF THE INVENTION

The invention relates generally to the field of oil extraction, and more particularly, to the field of extraction of oil from old wells and tar sands.

BACKGROUND OF THE INVENTION

Marginal oil wells are an often overlooked, but vitally important segment of the North American petroleum industry. Secondary recovery or enhanced oil recovery (EOR) encompasses a variety of techniques designed to increase oil extraction/recovery from an existing well. In a typical oil well, pressure in an underground formation pushes oil upward, allowing it to be extracted. In older wells and mature fields, this pressure diminishes over time, decreasing the flow of oil. Typically, due to the significant drop in pressure, 30-70% of the original oil reserves remain untapped, as they are more difficult to recover using traditional (i.e. non-EOR) recovery methods.

Marginal or depleted wells have low oil output, but they still provide 17% of oil produced onshore in the US. Without these wells the US would have to increase imports by nearly 7% to make up for the shortage. While each individual well contributes only a small amount of oil (on average 1-3 barrels a day), there are roughly 400,000 of these wells in the United States and less than that in Canada. Combined, these marginal wells produced more than 321 million barrels of oil in 2005, according to the 2006 Full Marginal Well Report of the Interstate Oil and Gas Compact Commission.

Chemical EOR methods include polymer, surfactant/polymer (variations are called micellar-polymer, micro-emulsion, or low tension), water-flooding, and alkaline (or caustic) flooding. All these methods involve mixing chemicals in water prior to injection. Therefore, these methods require conditions that are very favorable for water injection: low-to-moderate oil viscosities, and moderate-to-high permeabilities. Hence, chemical flooding is used for oils that are more viscous than those oils recovered by gas injection methods but less viscous than oils that can be economically recovered by thermal methods. Reservoir permeabilities for chemical flooding need to be higher than for the gas injection methods, but not as high as for thermal methods. Since lower mobility fluids are usually injected in chemical floods, adequate injectivity is required. In most cases, reservoir brines of moderate salinity with low amounts of divalent ions are preferred since high concentrations may interact unfavorably with the injected chemicals.

Other methods include flue gas flooding, which is expensive, requiring extensive equipment to inject high pressure $CO_2$ gas or some other combination (e.g. steam/$CO_2$) into the well.

In some instances, only one type of enhanced recovery technique is applicable for a specific field condition but in many instances, more than one technique is possible. The selection of the most appropriate process is facilitated by matching reservoir and fluid properties to the requirements necessary for the individual enhanced oil recovery techniques. A summary of the technical screening guides for the more common EOR processes compared to developed formulation is given in Table 1.

TABLE 1

| Summary of Screening Criteria for EOR Methods | | | | | | |
|---|---|---|---|---|---|---|
| Method | Oil Viscosity | Composition | Oil Saturation | Formation Type | Depth ft | Temperature ° F. |
| CO2 | <10 cp | C2-C12 | >30% | Sandstone or carbonate | >2,000 | Not critical |
| EOR Formulation | <30 | Light Intermediates | >30% | Sandstone And carbonate | <8,000 | <200 |
| Alkaline | <200 | Some organic acids | Waterflood residual | Sandstone preferred | <9,000 | <200 |
| Polymer | <150 | Not critical | >10% | Sandstone preferred | <9,000 | <200 |
| Combustion | <1,000 | Asphaltic | >40-50% | Sand high porosity | >500 | >150 preferred |
| Steamflooding | >20 | Not critical | Variable | Stone with high porosity | 300-5,000 | Not critical |

A distinction is made between the oil properties and reservoir characteristics that are required for each process. For example, steam flooding is applicable for very viscous oils in relatively shallow formations. On the other extreme, $CO_2$ and hydrocarbon flooding work best with very light oils at depths that are great enough for miscibility to be achieved. Chemical flooding processes are applicable in low to medium viscosity oils; depth is not a major consideration except, at great depths, the higher temperature may help the extraction and dissolution processes.

Generally, shallow reservoirs are easy to work on they are relatively uniform with reasonable oil saturations, minimum shale stringers, and good areal extent.

Implementation of EOR process is expensive, time-consuming, and people-intensive. Substantial costs are often involved in the assessment of reservoir quality, the amount of oil that is potentially recoverable, laboratory work associated with the EOR process, computer simulations to predict recovery, and the performance of the process in field situation.

One of the first steps in deciding to consider EOR is, of course, to select reservoirs with sufficient recoverable oil and areal extent to make the venture profitable.

With any of the processes, the nature of the reservoir will play a dominant role in the success or failure of the process. Many past failures of commercial EOR products in the market have resulted because of unknown or unexpected reservoir problems. Thus, a thorough geological study is usually warranted.

There are documented limitations for various methods. For example $CO_2$ flooding results in poor mobility control due to very low viscosity of $CO_2$ gas and also the cost and availability of $CO_2$.

It has been reported that breakthrough of $CO_2$ causes corrosion in the producing wells; re-pressuring of $CO_2$ for recycling; and a high requirement of $CO_2$ per incremental barrel produced.

Polymer flooding requires high polymer concentration to achieve the desired mobility control. It is easily adsorbed and lost in clay formation. Also, it does not work well with high water levels and degrades in salinity and presence of divalent ions.

Alkaline flooding has many limitations, and is affected by carbonated formation. It produces scaling and plugging in the producing wells, requires high caustic consumption, and is thus environmentally friendly.

The combustion approach suffers from adverse mobility ratio, is a complex process, requires large capital investment, and is difficult to control. Produced flue gases present environmental problems.

The mechanism of steam flooding is basically heating the crude oil and reducing its viscosity and supplying sufficient pressure to drive oil to the producing well. There are several limitations to the method. Oil saturations must be quite high and the pay zone should be more than 20 feet thick to minimize heat losses to adjacent formations.

Steam flooding is applicable to viscous oils in massive, high permeability sandstones or unconsolidated sands. The method works best with shallow wells to reduce heat loss and costs of the operation. It is also recommended not to be used in carbonate reservoirs. Note that about one-third of the additional oil recovered is consumed to generate the required steam, so the cost per incremental barrel of oil is high.

There are a number of patent and non-patent references that describe the current state of the art of EOR. These include:
U.S. patent application 20090205823
U.S. Pat. No. 7,262,153
U.S. Pat. No. 7,229,950
U.S. Pat. No. 7,137,447
U.S. Pat. No. 6,302,209
U.S. Pat. No. 6,818,599
U.S. Pat. No. 6,022,834
Wubs, H. J., Beenackers, A. A. C. M (1994), Kinetics of H2S absorption into aqueous ferric solutions of EDTA and HEDT, American Institute of Chemical Engineers Journal, 40, 433-444.
Demmink, J. F.; and Beenackers, A. A. C. M (1998). Gas desulphurization with ferric chelates of EDTA and HEDTA; Industrial and Engineering Chemistry Research, 37, 1444-1453.
L. M. Frare et al, Environmental Progress and Sustainable Energy, Vol. 29, No. 1, April 2010
Alberta Chamber of Resources, Oil sands technology roadmap; unlocking the potential, Edmonton, Canada, 2004
Alberta Energy Utilities Board (AEUB), Alberta's reserves 2003 and Supply-Demand outlook 2003-2013, Calgary, 2003.

SUMMARY OF THE INVENTION

What is desired is a method and/or a composition for recovering oil from old wells and/or tar sands. The method and/or composition should improve one of the following aspects of oil recovery, at least in some cases: amount of oil recovered; environmental friendliness; cost; removal of sour gas.

Therefore, according to one aspect of the invention, there is provided a composition for extraction of oil from wells. The composition may include EDTA, which can form a complex with iron in ionic form (present in well water used to dilute the composition) to remove sour gas, preferably by reducing them to elemental sulfur in the presence of oxygen. The composition may comprise a primary mixture comprising 50-55% toluene, 15-19% d-limonene, 6.5-7% polyoxyethylene sorbitan mono-oleate, 15-15.5% PEG sorbitan monostearate, 3.4-9.9% tall fatty acid, and EDTA in an amount from less than 0.1% to 1% (all of these percentages w/w). In an alternate embodiment, the PEG sorbitan monostearate may be replaced by polyoxyethylene sorbitan monostearate. In an alternate embodiment, the toluene may be replaced by, or partly replaced by, another aromatic alkyl such as, for example, methyl benzene, dimethyl benzene, xylene isomers, trimethyl benzene, ethyl benzene.

The composition preferably comprises the aforementioned mixture, diluted with water to make a 1-2% by weight solution of the mixture. The water may be well water. The water may be water containing high levels of ionic forms of iron ($Fe^{+2}$, $Fe^{+3}$).

In another embodiment, the mixture may contain no EDTA, or other builder salts. Such an embodiment may be provided in the absence of ionic iron in the water used to dilute the mixture, or when it is not necessary to remove sour gases.

In another embodiment of the invention, the composition may include other polyethylene glycol esters other than polyethylene glycol sorbitan monostearate.

In another embodiment of the invention, the composition is injected, poured or otherwise delivered into a depleted, marginal or old oil well. The composition is used to increase the rate at which oil is recovered from the well, or to increase the amount of oil recovered from the well. Preferably, the composition is introduced to the well in combination with air pressure to maximize recovery of oil from the well.

In an aspect of the invention, there is provided a method of extracting oil from a depleted oil well, comprising delivering the composition into the well, capping the well, pressurizing the well to maintain pressure over a residence time, and uncapping the well, to produce a surge of oil.

In another embodiment of the invention, the composition is mixed with tar sand, and agitated. The agitation may take place at room temperature. The composition may be mixed with the tar sand at an elevated temperature of 30-80 degrees Celsius. The viscous oil is thus separated from the sand. This method may be applied, mutatis mutandis, to other types of oil spills, such as spills on beaches and other contaminated matrices.

In an aspect of the invention, there is provided a method of extracting oil from a quantity of tar sand, the method comprising the steps of mixing the composition with the quantity of tar sand using mechanical agitation, allowing the oil to separate from the quantity of tar sand during a separation time period, such that it floats above the composition, and after the separation time period, removing the separated oil away from the composition and the quantity of tar sand.

DETAILED DESCRIPTION OF THE PREFERRED EMBODIMENTS

Figure 1:
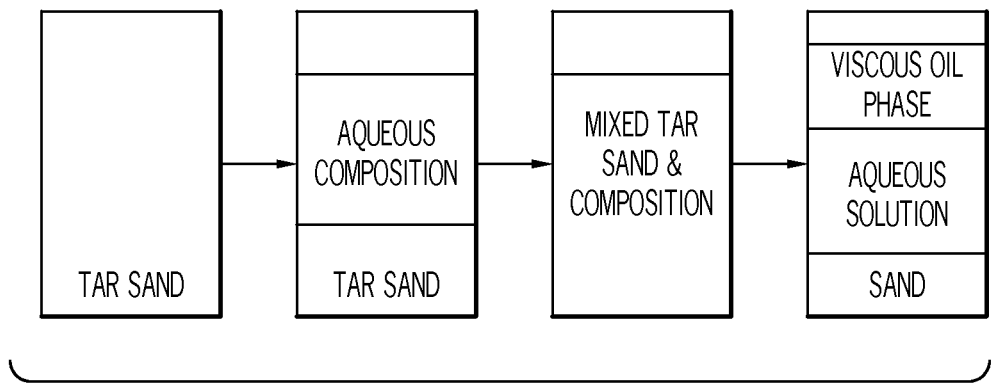
FIG. 1 is a schematic diagram showing the steps in the separation of oil from tar sands according to an aspect of the present invention.

The aforementioned composition was tested on depleted oil fields in Pennsylvania, most of which were shallow oil fields. So little oil was being recovered by traditional extraction methods that it had become uneconomical to continue using the traditional methods.

The composition was tested for oil viscosities of >30 cp with adequate mobility control. Good mobility control is essential allows for maximum utilization of the diluted mixture. The composition, which in this case was 5 gallons of mixture, mixed with 245 gallons of brine water (to make 2% solution) is reusable after recovery. After the first treatment, the produced initial emulsion was recovered and pumped back to the well to initiate another treatment.

In order to reduce the potential effect of high divalent ions, a special complex agent (in this case EDTA) was added to the mixture to ensure low adsorption of surfactants. The composition was tested in wells of temperature 200° F. with no adverse effect. The composition provides optimum reduction in interfacial tension over a range of water well salinity.

5 gallons of mixture was diluted in a tank with 245 gallons of brine water that was recovered from the depleted well in which the composition was being tested. The composition was poured into the well by gravity. Approximately, one barrel can treat ten wells and the used water goes back to the well.

The well was pressurized with a compressor to 150-190 psi for approximately 1 hour and capped for 2-3 days. Once the wells were uncapped, there was an initial surge of the composition, then of some oil and then a surge of crude oil. Generally most of the non-productive old wells on which the composition was tested from 0.1 to 0.5 barrel per day, whereas, semi productive old wells produced up to 1-2 barrels per day.

The effect of pressure was not fully explored and it is believed that the more efficient a compressor the better a more highly pressurized well can be delivered, and the better the mobility into the underground strata.

Due to timing logistics, the amount of incubation was 2-3 days, although some laboratory data showed that longer residence time in the formation resulted in better oil concentration and a prolonged surge of oil over several weeks.

TABLE 2

Field Test Data on Oil Recovery Composition

| Site Number | Average depth | Applied pressure | Residence time | Output |
|---|---|---|---|---|
| P11011 | 1000-3000 ft | 154 psi | 2-3 days | 0.5 barrel/day |
| P12012 | 2,270 ft | 190 psi | 3 days | 0.9 barrel/day |
| P13011 | 4,010 ft | 198 psi | 3 days | 1.1 barrel/day |
| P09011 | 1,610 ft | 165 psi | 2-3 days | 0.1-0.2 barrel/day |
| P15011 | 3,020 ft | 199 psi | 3 days | 1.4-1.6 barrel/day |

Pressure affected the active EOR fluid slug migration into the formation and interaction with oil bank. The composition was feasible to operate at depths exceeding 8,000 ft and not affected by temperature (max. 200° F.). Permeability range for working formulation was established under laboratory conditions and ranged from <10 md to over 1,000 md. A minimum of 10 md is required in order to inject the composition and to produce the released oil from the rock. The composition was found to deliver good yield with oil viscosities ranging from 0.1 to 100 cp and at higher viscosities it became harder to recover high viscosity heavy oils trapped in the formation. Generally, oil recovery is easiest with light oil in very permeable reservoirs and at shallow or intermediate depths.

The composition can also be used to recover oil from tar sands. Tar sands, also known as bituminous sands or oil sands, represent close to 60% of the world's estimated oil reserves. Alberta is a major producer of oil from tar sands using conventional steam stripping methods. Unfortunately, these methods result in environmental damage and emission of volatile organic compounds (VOCs) to the atmosphere. Dissolved organics and VOCs can create serious contamination in rivers and local fresh water resources.

The tar sand oil extraction market is largely centered in few countries around the world. Canada is the largest supplier of crude oil and refined products to the United States, supplying about 20% of total U.S. imports, and exports more oil and products to the U.S. than it consumes itself. In 2006, bitumen production averaged 1.25 million barrels per day (200,000 m$^3$/day) through 81 oil sands projects, representing 47% of total Canadian petroleum production. This proportion is expected to increase in coming decades as bitumen production grows while conventional oil production declines.

Most of the oil sands of Canada are located in three major deposits in northern Alberta. These are the Athabasca-Wabiskaw oil sands of north northeastern Alberta, the Cold Lake deposits of east northeastern Alberta, and the Peace River deposits of northwestern Alberta. Between them they cover over 140,000 square kilometers (54,000 sq mi)—an area larger than England—and hold proven reserves of 1.75 trillion barrels (280×10$^9$ m$^3$) of bitumen in place. About 10% of this, or 173 billion barrels (27.5×10$^9$ m$^3$), is estimated by the government of Alberta to be recoverable at current prices, using current technology, which amounts to 97% of Canadian oil reserves and 75% of total North American petroleum reserves. The Cold Lake deposits extend across the Alberta's eastern border into Saskatchewan. In addition to the Alberta oil sands, there are major oil sands deposits on Melville Island in the Canadian Arctic islands, which are unlikely to see commercial production in the foreseeable future.

The Alberta oil sand deposits contain at least 85% of the world's reserves of natural bitumen (representing 40% of the combined crude bitumen and extra-heavy crude oil reserves in the world), but are the only bitumen deposits concentrated enough to be economically recoverable for conversion to synthetic crude oil at current prices. The largest bitumen deposit, containing about 80% of the Alberta total, and the only one suitable for surface mining, is the Athabasca Oil Sands along the Athabasca River. The mineable area (as defined by the Alberta government) includes 37 townships covering about 3,400 square kilometers (1,300 square miles) near Fort McMurray. The smaller Cold Lake deposits are important because some of the oil is fluid enough to be extracted by conventional methods. All three Alberta areas are suitable for production using in-situ methods, such as cyclic steam stimulation (CSS) and steam assisted gravity drainage (SAGD).

The chemical aqueous diluted composition described herein allows efficient stripping of the viscous oil from the sand and other matrices, using low heat or no heat, and with mechanical agitation.

The extraction process was executed at room temperature with mechanical agitation to mix of the aqueous composition with the tar sand. Separation of the oil from the sand took place at room temperature. When the temperature was elevated to the range 30-80° C., separation of the oil (bitumen) from the sand was accelerated. Essentially all of the bitumen is recovered and float on top of the aqueous layer, while the sand remains at the bottom of the flask.

After the oil has been skimmed off, the aqueous composition of the present invention can be reused for separating oil from tar sand.

Figure 2:
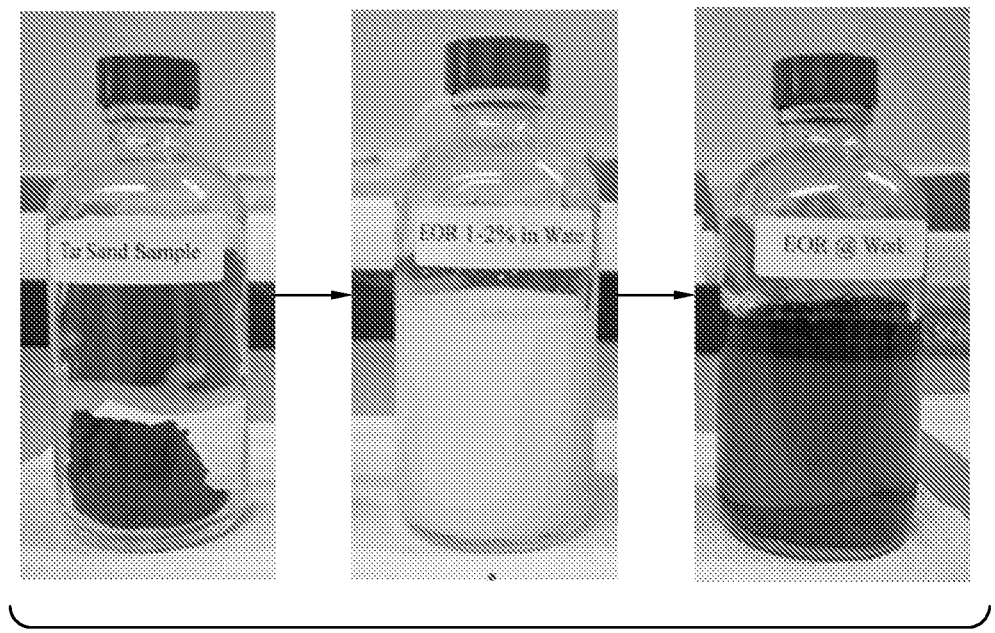
FIG. 2 is a photograph showing the steps in the separation of oil from tar sands according to an aspect of the present invention.

The process results in the separation of the sample into three distinct phases, as shown in FIGS. 1 and 2.

Experimental testing of the composition (the mixture in 1% aqueous solution) was demonstrated with 31.8 grams of Alberta's tar sand. The composition was added to the solid sand and agitated for 10 minutes. Separation of the phases was allowed for 30 minutes. The top layer of viscous oil was withdrawn with a pipette and weighted 3.42 grams. Percentage oil in sample was 10.8% w/w.

The process was repeated with a composition comprising the mixture in 2% aqueous solution with some heated at 50° C. for 30 minutes. Weight of bitumen was 23 grams and weight of skimmed oil was 3.1 grams, percentage oil in the sample 13.47%.

The average percentage oil in tar sands sample in 10-12 percent. The extraction method showed an efficiency of 83-90 percent at room temperature, and 96-100 percent at 50 degrees Celsius. A second extraction on the same sample, using the same solution used in the first extraction, yielded another 3-10 percent of bitumen at room temperature.

A preferred feature of the chemical composition is its ability to complex with sulfur compounds. Frequently, petroleum feeds and products contain varying amounts and types of sulfur compounds. Many sulfur compounds can be corrosive to equipment, can inhibit or destroy catalysts employed in downstream processing and can impart undesirable odors to products. Furthermore, many well waters contain high iron content in ionic forms ($Fe^{+2}$, $Fe^{+3}$). When the well water is used to dilute the mixture to 1-2% strength, one of the components in the mixture, EDTA (ethylene diamine tetraacetic acid), forms a stable complex which acts to reduce sour gases to elemental sulfur in the presence of oxygen. This elimination resides in the aqueous parts of the solution, which is removed during the extraction process.

Example mixtures include:
(a) 53% toluene, 15% d-limonene, 7% polyoxyethylene sorbitan mono-oleate, 15% of polyethylene glycol sorbitan monostearate, 9% tall fatty acid and 1% EDTA.
(b) 55% toluene, 19.5% d-limonene, 7% polyoxyethylene sorbitan mono-oleate, 16% polyethylene glycol sorbitan monostearate, 3.4% tall fatty acid, <0.1% EDTA.
(c) 50% toluene, 18% d-limonene, 7% polyoxyethylene sorbitan mono-oleate, 15% polyethylenesorbitan monostearate, 9.9% tall fatty acid, 0.1% EDTA.
(d) 55% toluene, 19% dipentene, 6.9% polyoxyethylene sorbitan mono-oleate, 19% polyethylenesorbitan monostearate, 0.1% EDTA.

It will be appreciated by those skilled in the art that the mixture generally comprises a one or more components that act as a solvent base (e.g. aromatic alkyls, dipentene, d-limonene), one or more components that act as a surfactant (e.g. polyethylene glycol sorbitan monostearate, polyethylenesorbitan monostearate, polyoxyethylene sorbitan mono-oleate), and, preferably, a complexing agent (e.g. EDTA).

A description of some exemplary embodiments of the invention is contained in the following numbered statements:

1. A composition for use in extracting oil, the composition comprising:
   a mixture comprising, by weight, 50-55% of an aromatic alkyl, 15-19% d-limonene, 6.5-7% polyoxyethylene sorbitan mono-oleate, 15-15.5% PEG sorbitan monostearate, 3.4-9.9% tall fatty acid, and EDTA in an amount up to 1%;
   water in an amount such that the mixture is diluted to 1%-2% by weight of the composition.

2. A composition for use in extracting oil, the composition comprising:
   a mixture comprising, by weight, 50-55% of an aromatic alkyl, 15-19% d-limonene, 6.5-7% polyoxyethylene sorbitan mono-oleate, 15-15.5% polyoxyethylene sorbitan monostearate, 3.4-9.9% tall fatty acid, and EDTA in an amount up to 1%;
   water in an amount such that the mixture is diluted to 1%-2% by weight of the composition.

3. A composition as recited in statement 1 or 2, wherein the aromatic alkyl comprises toluene.

4. The use of the composition of any of statements 1, 2 or 3 to extract oil from a depleted oil well.

5. The use of the composition of any of statements 1, 2 or 3 to extract oil from tar sand.

6. A method of treating a depleted oil well to increase oil production from the depleted oil well, the method comprising:
   delivering the composition of any of statements 1, 2 or 3 into the well;
   pressurizing the well;
   capping the well to maintain the pressure over a residence time; and
   uncapping the well;
   whereby a surge of oil is produced.

7. A method as stated in statement 6, wherein the well is pressurized to between 150-190 pounds per square inch.

8. A method as stated in statement 6, wherein the residence time comprises a 2-3 day period.

9. A method of extracting oil from a quantity of tar sand, the method comprising:
   mixing the composition of any of statements 1, 2 or 3 with the quantity of tar sand using mechanical agitation;
   allowing the oil to separate from the quantity of tar sand during a separation time period, such that it floats above the composition;
   after the separation time period, removing the separated oil away from the composition and the quantity of tar sand.

10. A method as stated in statement 9, the method further comprising keeping the tar sand at a temperature of 30-80 degrees Celsius during at least part of the separation time period.

11. A method as stated in statement 9, wherein the tar sand is kept at room temperature during the separation time period.

12. A method as stated in statement 9, further comprising the step of reusing the composition to extract more oil from the quantity of tar sand.

13. A method as stated in statement 9, further comprising the step of reusing the composition to extract oil from a second quantity of tar sand.

The invention claimed is:
1. A composition for use in extracting oil, the composition comprising:

a mixture comprising, by weight, 50-55% of an aromatic alkyl, 15-19% d-limonene, 6.5-7% polyoxyethylene sorbitan mono-oleate, 15-15.5% PEG sorbitan monostearate, 3.4-9.9% tall fatty acid, and EDTA in an amount up to 1%;

water in an amount such that the mixture is diluted to 1%-2% by weight of the composition.

2. A composition as claimed in claim 1, wherein the aromatic alkyl comprises toluene.

3. A method of treating a depleted oil well to increase oil production from the depleted oil well, the method comprising:

delivering the composition of claim 1 into the well;
pressurizing the well;
capping the well to maintain the pressure over a residence time; and
uncapping the well;
whereby a surge of oil is produced.

4. A method as claimed in claim 3, wherein the well is pressurized to between 150-190 pounds per square inch.

5. A method as claimed in claim 3, wherein the residence time comprises a 2-3 day period.

6. A method of extracting oil from a quantity of tar sand, the method comprising:

mixing the composition of claim 1 with the quantity of tar sand using mechanical agitation;
allowing the oil to separate from the quantity of tar sand during a separation time period, such that it floats above the composition;
after the separation time period, removing the separated oil away from the composition and the quantity of tar sand.

7. A method as claimed in claim 6, the method further comprising keeping the tar sand at a temperature of 30-80 degrees Celsius during at least part of the separation time period.

8. A method as claimed in claim 6, wherein the tar sand is kept at room temperature during the separation time period.

9. A method as claimed in claim 6, further comprising the step of reusing the composition to extract more oil from the quantity of tar sand.

10. A method as claimed in claim 6, further comprising the step of reusing the composition to extract oil from a second quantity of tar sand.

* * * * *